UNITED STATES PATENT OFFICE.

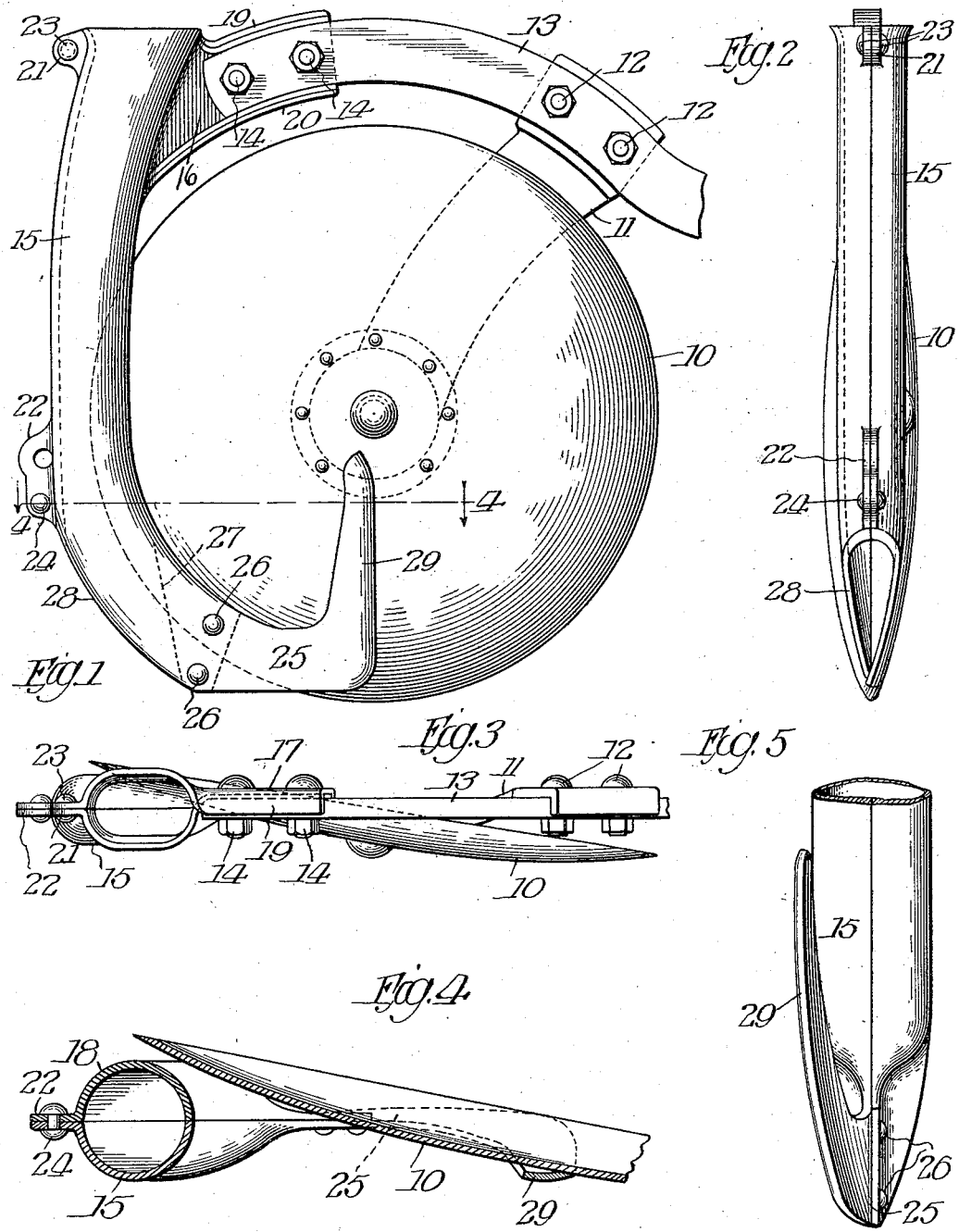

PETER BROMAN, OF BEAVER DAM, WISCONSIN, ASSIGNOR TO BEAVER DAM MANUFACTURING COMPANY, OF BEAVER DAM, WISCONSIN, A CORPORATION OF WISCONSIN.

GRAIN-DRILL.

1,022,530.  Specification of Letters Patent.  Patented Apr. 9, 1912.

Application filed October 5, 1911. Serial No. 653,078.

*To all whom it may concern:*

Be it known that I, PETER BROMAN, a citizen of the United States, residing at Beaver Dam, in the county of Dodge and State of Wisconsin, have invented certain new and useful Improvements in Grain-Drills, of which the following is a specification.

One of the objects of this invention is the provision of an associated concavo-convex furrow opening disk, a boot or seed duct to convey the grain to the ground, and a combination furrow opener and scraper for the convex side of the disk, so constructed and positioned that it is integral with one of a number of sheet metal parts or sections of which the boot or seed conduit is formed, and is so related to the disk that it not only assists in opening the furrow, but also keeps the convex face of the disk clean and free from weeds and trash, and in addition holds the furrow open a sufficient length of time to permit the proper discharge of the grain into the same. In order to assist in the proper delivery of the seed to the furrow while the same is fully open, the lower or bottom end of the seed conduit or boot is curved forward slightly and the discharge of the seed through this lower curved end while the furrow is kept open by the blade or scraper results in the proper and unhampered delivery of the seeds or kernels into the bottom of the furrow without danger of the ground or earth partially falling into the furrow before the seeds reach the same. In similar devices as heretofore constructed, the scraper or blade was not positioned to accomplish this result of holding the furrow open to the best advantage and I have found that to secure this function it is desirable instead of having the blade or scraper project forwardly and upwardly in a curve from the toe of the boot that it is better to have the same extend upwardly substantially vertically or possibly inclined slightly rearwardly. In other words, in my improved construction I bring the delivery end of the boot and the main body of the scraper relatively close together to secure the maintenance of the furrow open a sufficient length of time for the effective delivery of the seeds or kernels thereto.

As indicated above, the boot or seed conduit is preferably made of sheet steel in two parts riveted or otherwise secured together, one of such sheet metal sections having integral therewith the furrow opening and disk scraping blade. Because of the resiliency which such a sheet metal blade possesses, it can automatically and readily conform to the convex curvature of the disk and will be sufficiently elastic to permit a wabbly motion of the disk which occasionally happens. Since such a boot and furrow opening scraper will take a high polish, it will consequently travel easily through the soil, the blade and toe of the boot forming a land-side for temporarily holding the furrow open, and, in addition, owing to the thinness of the metal employed, the unobstructed space between the grain drills in a gang device of this character can be considerably increased.

In order that those skilled in this art may have a full and clear comprehension of this invention, I have illustrated a desirable embodiment of the same in the figures of the accompanying drawing which forms a part of this specification, and to which reference should be had in connection with the following detailed description of the structure:

In these drawings: Figure 1 illustrates a fragment of a grain drill embodying this invention, the concave disk being viewed from its convex side. Fig. 2 is a rear elevation of the structure shown in Fig. 1. Fig. 3 is a plan view of the structure shown in Fig. 1. Fig. 4 is a horizontal section on the broken line 4—4 of Fig. 1 on an enlarged scale, and Fig. 5 is a fragmentary elevation of the lower portion of the boot and scraper as viewed from the right hand of Fig. 1, this illustration being also on an enlarged scale.

Referring to this drawing, it will be noticed that the usual concavo-convex furrow opening disk 10 is rotatably mounted in a suitable bearing at the lower end of the depending arm 11, fastened at its upper end by means of bolts 12, 12 to a drag or draft bar 13, the rear portion only of which is illustrated in the figures and is shown as having a curved contour. As is customary, this concave disk is angularly disposed with relation to the lengthwise dimension of the drag bar to effect and perform its furrow opening function, as is clearly indicated in Fig. 3.

The boot or seed-duct is rigidly fastened by means of bolts 14, 14 to the rear end of the drag-bar and in this instance the boot is composed of two sheet-metal, (preferably steel) sections or parts riveted or otherwise secured together to form the seed-duct or conduit, each part of the boot being approximately of semi-circular shape in cross-section. The outermost steel section 15 of the boot has at its upper end a curved forwardly projecting attachment ear or lug 16 lying at one side of the rear end of the drag-bar 13 and fastened thereto by means of the bolts 14, 14, which also secure to the drag-bar the corresponding attachment ear 17 of the other sheet-metal boot-section 18. Each of these ears 16 and 17 has along its top and bottom edges laterally turned flanges 19 and 20 overlapping the top and bottom edges of the drag-bar 13 to assist in maintaining the boot or seed-duct in proper position. Each of the sections 15 and 18 has at the rear of the boot outstanding ears 21 and 22 riveted together at 23 and 24 to maintain the two halves of the seed-duct or conduit in proper assembled relation. The outer section 15 at its lower end extends forwardly in the form of a substantially flat portion 25 adjacent to the lower edge of the disk 10 and constituting the toe of the boot.

As is clearly shown in Fig. 5, the lower portions of the two steel sections 15 and 18 of the boot are flattened and held together by rivets 26, 26 so that the toe 25 of the boot is composed only of one sheet-metal section of the boot, preferably, though not necessarily, the outer one. In order that the seeds or kernels descending into boot 15 may be delivered to the ground well forwardly, the lower portion of the conduit of the tube is curved or extended forwardly as is indicated by the junction line 27 and the opening 28 at the bottom of the boot through which the kernels are discharged into the furrow. In this construction therefore, the seeds or kernels are dropped into the furrow farther forward than has heretofore been customary, in order that the furrow may not partially close before the seeds are properly delivered thereto. The toe 25 of the boot has integral therewith an upwardly extended blade or scraper 29 which is substantially vertically arranged, or which may in fact, incline rearwardly to some extent, this blade being curved longitudinally, as shown for example in Fig. 5, so as to closely follow the curvature of the convex face of the disk against which it bears and with which it coöperates to perform the functions of assisting in the opening of the furrow, to keep the disk clean, and to hold the furrow open until the seeds or kernels have been properly deposited in the bottom thereof. If such a blade or scraper 29 projects forwardly and upwardly rather than directly upwardly or slightly rearwardly from the toe of the boot, it will not hold the furrow open as well as in the present instance so that an effective and efficient planting of the seeds is not secured. Inasmuch as such a blade or scraper 29 is integral with the boot its connection therewith is of the best and strongest character, and since it is made of steel or similar metal, it can readily accommodate itself to any possible irregularities or wabbling in the action of the disk. It should be noticed that in this improved construction the toe 25 of the boot extends rearwardly from the lower end of the blade or scraper in a direction substantially parallel with the line of draft and forms a land-side acting in conjunction with the blade or scraper to maintain the furrow open until the seeds are planted, which is facilitated and hastened in this device because of the forward inclination or curvature of the lower end of the passage in the boot.

From this description and illustration it should be clear that in this device the boot is attached to a draw bar extended parallel with the line of draft and directly over the center of the soil-cutting concave disk, the sheet metal steel boot made in sections being attached to the rear end of such draw bar as has been indicated above. In addition, it should be noted that when the blade or seed conduit is made of steel it will have sufficient resiliency and elasticity to follow the curved shape of the disk and maintain proper contact therewith, even though the disk may have a wabbly motion, and furthermore, such a scraper and boot will take on a comparatively high polish and therefore run through the soil easily forming a land-side which travels against the unplowed land. Because of the relative thinness of the parts of this construction as compared with the older devices of the prior art, an increased space can be secured between the disks, resulting in a more favorable and advantageous planting of the seed.

While I have herein described one particular embodiment of this invention in detail, I wish to have it understood that the invention is not in any way limited or restricted to this particular embodiment, because many minor mechanical changes may be made in such a construction without departure from the substance of the invention and without the sacrifice of any of its material benefits and advantages.

I claim:

1. In a grain drill, the combination of a suitably-supported rotary furrow-opening disk, a boot composed of a plurality of sheet-metal sections secured together, and a blade-like disk-scraper co-acting with said disk and formed integral with one of the sheet-metal sections of said boot, substantially as described.

2. In a grain drill, the combination of a suitably-supported rotary furrow-opening disk, a boot composed of a plurality of sheet-metal sections secured together, and a blade-like disk-scraper co-acting with said disk, formed integral with one of the sheet-metal sections of the boot, and having a scraping edge along a substantially vertical radius of said disk, substantially as described.

3. In a grain drill, the combination of a suitably-supported rotary concavo-convex furrow-opening disk, a boot composed of a plurality of sheet-metal sections secured together, and a blade-like disk-scraper co-acting with the convex face of the disk and formed integral with one of the sheet-metal sections of the boot, substantially as described.

4. In a grain drill, the combination of a suitably-supported rotary concavo-convex furrow-opening disk, a boot composed of a plurality of sheet-metal sections secured together, and a blade-like disk-scraper co-acting with the convex side of the disk, formed integral with one of the sheet-metal sections of the boot, and having a scraping edge along a substantially vertical radius of said disk, substantially as described.

5. In a grain drill, the combination of a suitably-supported rotary concavo-convex furrow-opening disk disposed angularly with relation to the direction of travel of the drill, a boot composed of a plurality of sheet-metal sections secured together and disposed rearwardly of said disk, and a flexible blade-like scraper co-acting with the convex side of said disk and formed integral with one of the sheet-metal sections of the boot, the scraper extending upwardly from the toe of the boot, substantially as described.

6. In a grain drill, the combination of a suitably-supported rotary concavo-convex furrow-opening disk, disposed angularly with relation to the direction of travel of the drill, a boot composed of a plurality of sheet-metal sections secured together and disposed rearwardly of said disk, and a flexible blade-like scraper co-acting with the convex side of said disk and formed integral with one of the sheet-metal sections of the boot, said scraper extending upwardly from the toe of the boot and having a disk-scraping edge along a substantially vertical radius of said disk, substantially as described.

7. In a grain drill, the combination of a suitably-supported rotary concavo-convex furrow-opening disk disposed angularly with relation to the direction of travel of the drill, a boot disposed rearwardly of said disk, and a flexible blade-like scraper co-acting with the convex side of the disk and formed integral with the boot, said scraper extending upwardly from the toe of the boot and having a scraping edge along a substantially vertical radius of said disk, substantially as described.

8. In a grain drill, the combination of a suitably-supported rotary concavo-convex furrow-opening disk, a boot disposed rearwardly of said disk, and a flexible blade-like scraper co-acting with the convex side of said disk and rigidly secured to said boot, said scraper extending upwardly from the toe of the boot and having a disk-scraping edge along a substantially vertical radius of said disk, substantially as described.

9. In a grain drill, the combination of a suitably-supported rotary concavo-convex furrow-opening disk disposed angularly with relation to the direction of travel of the drill, a boot having a passage therethrough, the lower end of which is inclined forwardly, and a flexible blade-like scraper integral with said boot co-acting with the convex side of the disk and extending upwardly from the toe of the boot, said scraper having a disk-scraping edge along a substantially vertical radius of said disk, substantially as described.

10. In a grain drill, the combination of a suitably-supported rotary concavo-convex furrow-opening disk, a boot composed of a plurality of sheet-metal sections secured together and having a passage therethrough, the lower end of which passage is inclined forwardly, and a flexible blade-like scraper integral with one of the sheet-metal sections of the boot and co-acting with the convex side of the disk, said scraper extending upwardly from the toe of the boot and having a disk-scraping edge along a substantially vertical radius of said disk, substantially as described.

PETER BROMAN.

Witnesses:
EDWARD BEICHL,
H. A. BIRD.

---

Copies of this patent may be obtained for five cents each, by addressing the "Commissioner of Patents, Washington, D. C."